UNITED STATES PATENT OFFICE.

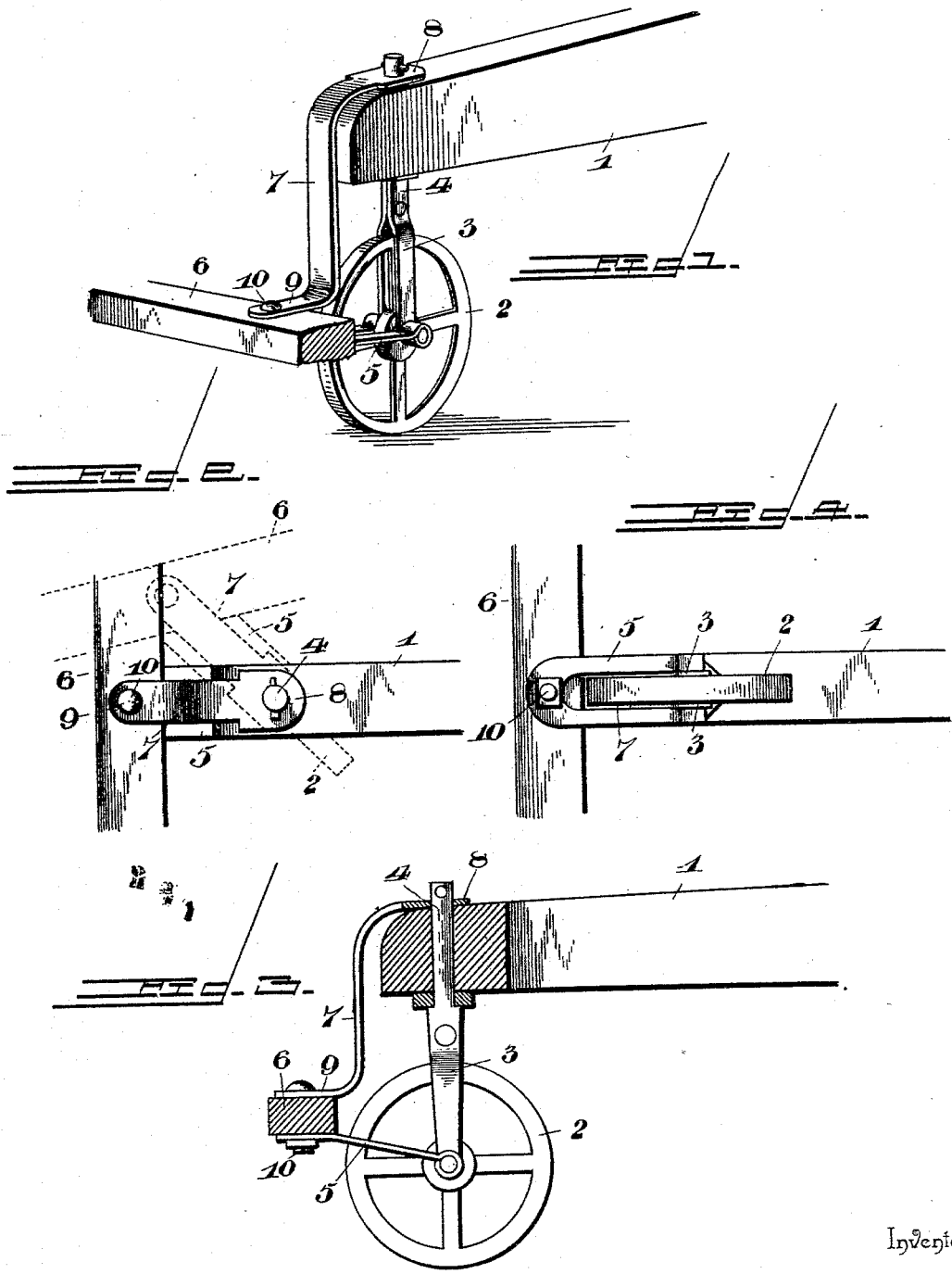

ALBERT N. CROSS, OF BABCOCK, WISCONSIN.

DRAFT ATTACHMENT FOR AGRICULTURAL MACHINES.

SPECIFICATION forming part of Letters Patent No. 565,135, dated August 4, 1896.

Application filed May 20, 1896. Serial No. 592,329. (No model.)

*To all whom it may concern:*

Be it known that I, ALBERT N. CROSS, a citizen of the United States, residing at Babcock, in the county of Wood and State of Wisconsin, have invented a new and useful Draft Attachment for Agricultural Machines, of which the following is a specification.

This invention relates to draft attachments for farm implements designed to be drawn over the field for cultivating and preparing the land for planting, and aims to reduce the length of the pole or tongue so that the team or horse can make a short turn to recross the field or for any required purpose.

The invention also relieves the team of the sawing and jerking action and the weight upon their necks resulting from the use of long poles or tongues.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the end portion of a stub pole or tongue having the invention applied thereto. Fig. 2 is a top plan view thereof, showing an adjusted position of the draft attachment by dotted lines. Fig. 3 is a side elevation, parts being broken away. Fig. 4 is a view of the invention inverted.

Corresponding and like parts are referred to in the following description and indicated in the several views of the drawings by the same reference-characters.

The numeral 1 represents a shortened or stub pole or tongue of an agricultural implement, and 2 is the pilot or caster-wheel, which is journaled between the forked members of a frame 3, whose shank 4 is journaled in the end of the pole or tongue, so as to admit of the caster wheel turning freely in either direction to adapt itself to the draft. A slotted or approximately U-shaped plate 5 has its side members extending along the sides of the caster or pilot wheel and engaged with the projecting ends of the axle or shaft of the caster-wheel. This plate 5 extends upwardly and forwardly from its rear end, and the doubletree 6 is applied thereto, a brace or stay 7 strengthening the plate 5 and connecting the doubletree 6 with the upper end of the shank 4. The main portion of the brace or stay extends about vertically, and its terminal portions 8 and 9 extend horizontally and are apertured, the upper terminal 8 extending over the top side of the pole or tongue and receiving the upper end of the shank 4, and the lower terminal 9 projecting over the doubletree and receiving a pin or bolt 10, which passes through the doubletree and connects the terminal 9 with the front end of the plate 5.

From the foregoing description it will be seen that the caster or pilot wheel is adapted to turn to accommodate itself to the direction of the draft, and the doubletree 6 is likewise disposed to readily conform to the direction of the draft, so that the team can make a comparatively short turn for recrossing the field or for any required purpose.

Having thus described the invention, what is claimed as new is—

1. A draft attachment for agricultural implements, comprising a frame vertically journaled and bearing a caster-wheel, a plate having portions extending along the sides of the caster-wheel and secured to the lower end of the vertically-journaled frame, a brace or stay extending about parallel with the frame and having its terminal portions bent in opposite directions, the upper terminal receiving the upper end of the shank of the said frame, and a doubletree placed between the lower terminal of the said brace and the front end of the plate and mounted upon a pin or bolt connecting the said parts, substantially as set forth.

2. The combination with a stub pole or tongue, of a frame forked at its lower end and having a shank at its upper end vertically journaled in the pole or tongue, a pilot-wheel journaled between the forked members of the frame, a slotted plate having its members extending along the sides of the pilot-wheel and engaged with the ends of its axle or shaft, a brace extending about vertically and having its terminal portions bent horizontally in opposite directions, the upper terminal receiving the upper end of the shank of the frame, and a doubletree placed between the lower terminal of the brace and the front end of the slotted plate and mounted upon the pin or bolt connecting these parts, substantially as specified.

In testimony that I claim the foregoing as my own I have hereto affixed my signature in the presence of two witnesses.

ALBERT N. CROSS.

Witnesses:
H. W. REMINGTON,
MARY S. REMINGTON.